United States Patent
Munguia et al.

Patent Number: 5,845,096
Date of Patent: Dec. 1, 1998

[54] ADAPTIVE ARBITRATION MECHANISM FOR A SHARED MULTI-MASTER BUS

[75] Inventors: Gabriel Roland Munguia, Phoenix; Peter Chambers, Scottsdale, both of Ariz.

[73] Assignee: VLSI Technology, Inc., San Jose, Calif.

[21] Appl. No.: 703,712

[22] Filed: Aug. 26, 1996

[51] Int. Cl.$^6$ .................................................. G06F 13/14
[52] U.S. Cl. .......................... 395/293; 395/296; 395/303; 395/728; 395/732
[58] Field of Search ........................ 395/292, 293, 395/287, 294, 299, 296, 728, 730, 732, 289, 301, 303

[56] References Cited

U.S. PATENT DOCUMENTS

| | | | |
|---|---|---|---|
| 4,481,583 | 11/1984 | Mueller | 395/732 |
| 5,253,348 | 10/1993 | Scalise | 395/325 |
| 5,303,382 | 4/1994 | Buch et al. | 395/725 |
| 5,392,407 | 2/1995 | Heil et al. | 395/325 |
| 5,440,752 | 8/1995 | Lentz et al. | 395/303 |
| 5,487,168 | 1/1996 | Geiner et al. | 395/650 |
| 5,502,824 | 3/1996 | Heil | 395/293 |
| 5,533,204 | 7/1996 | Tipley | 395/288 |
| 5,555,383 | 9/1996 | Elazar et al. | 395/306 |
| 5,572,686 | 11/1996 | Nunziata et al. | 395/296 |

*Primary Examiner*—Meng-Ai T. An
*Assistant Examiner*—Xuong M. Chung-Trans
*Attorney, Agent, or Firm*—Wagner, Murabito & Hao

[57] ABSTRACT

A system and method for determining which of plurality of peripheral components will have access to a peripheral component interconnect (PCI) bus when none of the plurality of peripheral components is currently requesting access to the PCI bus. In one embodiment a history buffer records all requests by a plurality of peripheral components for access to the PCI bus. The present invention then determines which of the plurality of peripheral components requests access to the PCI bus most often. Next, the present invention grants the peripheral component which requests access to the PCI bus most often access to the PCI bus when no other peripheral component is requesting access to the PCI bus. In so doing, the present invention "parks" the PCI bus on the peripheral component which has, in the past, requested access to the PCI bus most often.

17 Claims, 4 Drawing Sheets

ADAPTIVE ARBITRATION MECHANISM FOR A SHARED MULTI-MASTER BUS

TECHNICAL FIELD

The present claimed invention relates to the field of computer busses. More specifically, the present claimed invention relates to the arbitration of peripheral component interconnect (PCI) bus access among multiple peripheral components.

BACKGROUND ART

PCI bus systems constitute an industry standardized, widely known, and widely used approach for transporting data within a computer system. As shown in Prior Art FIG. 1, a typical PCI bus arbitration system 100 is comprised of the PCI bus 102, multiple peripheral components 104, 106, and 108, and a PCI bus arbiter 110. PCI bus 102 is coupled to each of peripheral components 104, 106, and 108 by links 112, 114, and 116 respectively. Additionally, each of peripheral components 104, 106, and 108 is coupled to PCI bus arbiter 110 via request and grant lines 118 and 120, 122 and 124, and 126 and 128, respectively.

Referring still to Prior Art FIG. 1, PCI bus arbiter 110 typically receives requests from peripheral components 104, 106, and 108 for access to PCI bus 102. PCI arbiter 110 then determines which of the requesting peripheral components will be provided with access to PCI bus 102. PCI arbiter 110 then asserts the chosen peripheral component's grant line, and the chosen peripheral component is able to access PCI bus 102.

In a PCI bus environment, because the PCI bus lines are not terminated, one peripheral component must always be granted access to the PCI bus. If one device is not granted to the PCI bus, the PCI bus will "float" at an intermediate state and will be susceptible to oscillation. Thus, it is said that in a PCI bus environment, some device must always "drive" the PCI bus. Hence, when none of the peripheral components 104, 106, and 108 are accessing PCI bus 102, PCI bus arbiter 110 must still assert the respective grant line of one of peripheral components 104, 106, and 108. Thus, even if a peripheral component is not requesting access to PCI bus 102, the peripheral component may still be given access to PCI bus 102. Asserting a grant line to a non-requesting peripheral component is referred to as "parking" the PCI bus. In conventional PCI bus environments, the PCI bus is "parked" on the last requesting peripheral component. Therefore, if grant line 120 of peripheral component 104 is asserted, when peripheral component 104 no longer requests access to PCI bus 102, and no other peripheral component is currently requesting access to PCI bus 102, grant line 120 of peripheral component 104 will remain asserted. That is, PCI bus arbiter 110 will park PCI bus 102 on peripheral component 104 even though peripheral component 104 is no longer requesting access to PCI bus 102. Although such a parking technique is functional, the technique does not predict which peripheral component will be most likely to request access to the PCI bus in the future.

PCI bus systems which employ conventional PCI bus parking methods often suffer from substantial PCI bus latency periods. For example, if PCI bus 102 is parked on peripheral component 104, and peripheral component 106 later requests access to PCI bus 102, several steps must occur before peripheral component 102 is granted access to PCI bus 102. First, PCI bus arbiter 110 must receive the request from peripheral component 106 for access to PCI bus 102. Next, PCI bus arbiter 110 must deassert grant line 120 of peripheral component 104. Finally, PCI bus arbiter 110 will be able to assert grant line 124 of peripheral component 106. Thus, a substantial number of clock cycles may pass before peripheral component 106 is allowed access to PCI bus 102. The period of time that passes from when peripheral component 106 requests access to PCI bus 102 until peripheral component 106 is granted access to PCI bus 102 is referred to as a latency period. Therefore, over a period of time, the total latency period can adversely affect operation and speed of a computer system.

Thus, a need exists for a system and method for determining the appropriate peripheral component on which to park the PCI bus. A further need exists for a system method which does not merely grant access to the PCI bus to the last peripheral component to have accessed the PCI bus. Still another need exists for a PCI arbitration system and method which decreases PCI bus access latency periods.

DISCLOSURE OF THE INVENTION

The present invention provides a system and method for determining the appropriate peripheral component on which to park the PCI bus wherein the system method which does not merely grant access to the PCI bus to the last peripheral component to have accessed the PCI bus. The present invention also provides a system and method which decreases PCI bus access latency periods. The present invention meets the above needs with an adaptive arbitration system and method for determining which of plurality of peripheral components will have access to a peripheral component interconnect (PCI) bus when none of the plurality of peripheral components is currently requesting access to the PCI bus.

Specifically, in one embodiment, a history buffer records all requests by a plurality of peripheral components for access to the PCI bus. The present invention then determines which of the plurality of peripheral components requests access to the PCI bus most often. Next, the present invention grants the peripheral component which requests access to the PCI bus most often access to the PCI bus when no other peripheral component is requesting access to the PCI bus. In so doing, the present invention "parks" the PCI bus on the peripheral component which has, in the past, requested access to the PCI bus most often.

In another embodiment, a history buffer records all requests by a plurality of peripheral components for access to the PCI bus. The present embodiment also includes a weight buffer. The weight buffer weights each of the recorded requests such that each of the recorded requests has a priority value associated therewith. The present embodiment the adds the priority values for each of the recorded requests such that each of the peripheral components has a total priority value associated therewith. Next, in this embodiment, the present invention compares the summed priority values to determine which of the peripheral components has the greatest priority value. The present embodiment then grants the peripheral component having the greatest priority value access to the PCI bus when no other of the plurality of peripheral components requests access to the PCI bus. In so doing, the present invention "parks" the PCI bus on the peripheral component which has the greatest priority value based on past usage of the PCI bus.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
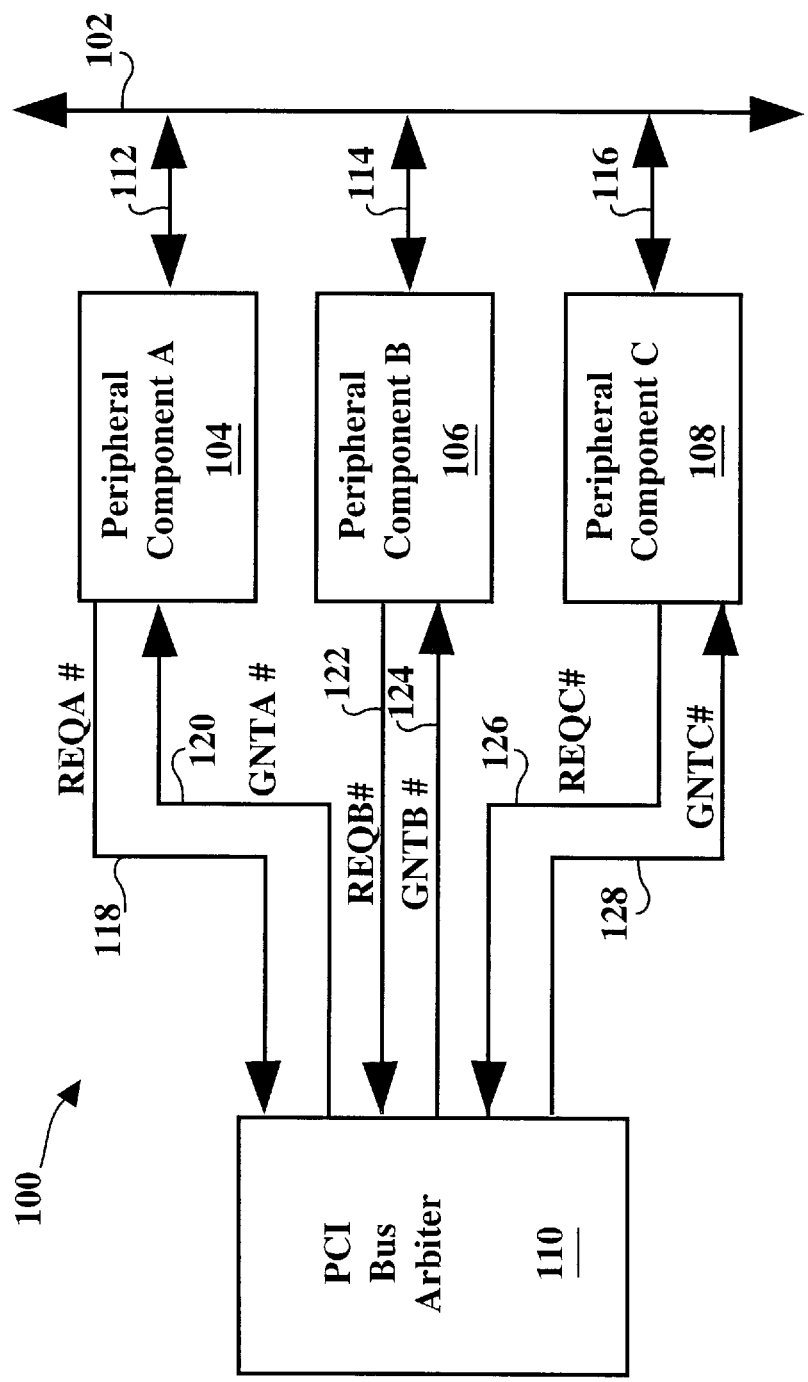
FIG. 1 is a schematic diagram of a conventional PCI bus arbitration system.
Figure 2:
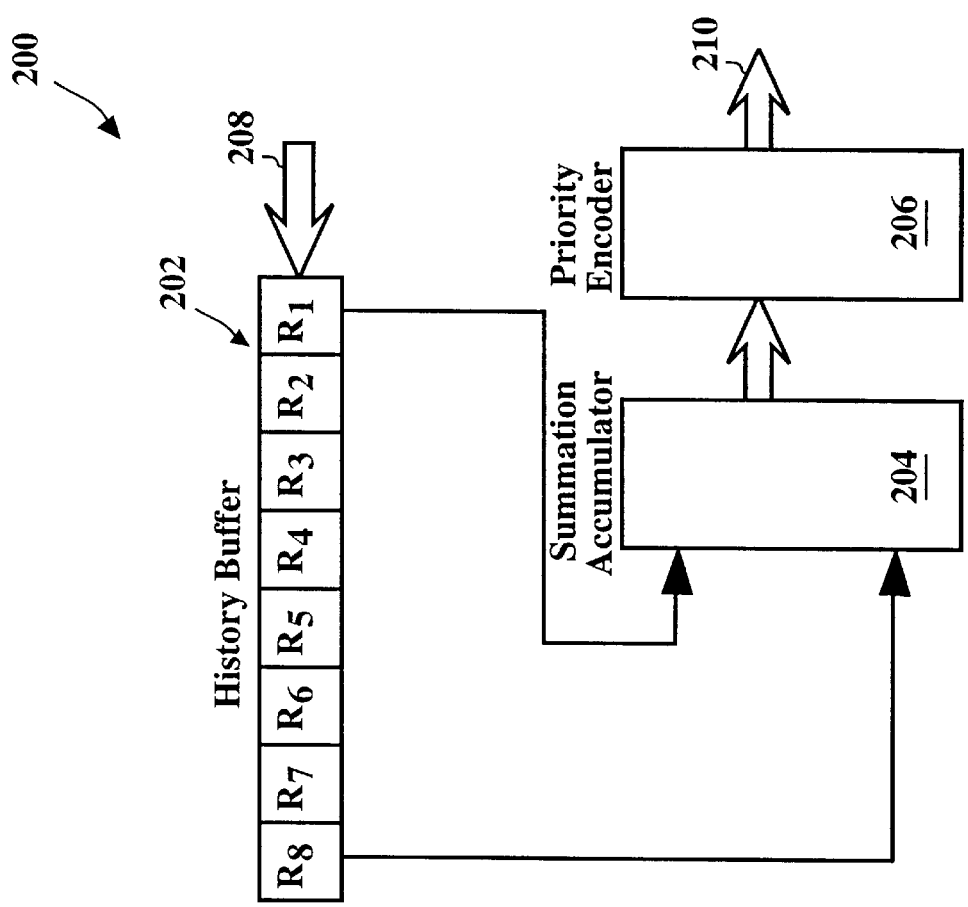
FIG. 2 is a schematic diagram illustrating components of an adaptive arbiter in accordance with one embodiment of the present claimed invention.

With reference now to FIG. 2, a schematic diagram illustrating components of an adaptive PCI bus arbiter 200 in accordance with one embodiment of the present invention is shown. In the present embodiment, adaptive PCI bus arbiter 200 (hereinafter adaptive arbiter 200) is comprised of a history buffer 202, a summation accumulator 204, and a priority encoder 206. Adaptive arbiter 200 uses history buffer 202, summation accumulator 204, and priority encoder 206 to intelligently predict the proper peripheral component on which to park the PCI bus. A detailed description of the manner in which adaptive arbiter achieves such an accomplishment is set forth below.

Adaptive arbiter 200 of FIG. 2 includes an incoming request channel 208 for receiving PCI bus requests, and outgoing grant channel 210 represents respective grant lines of peripheral components, not shown, coupled to adaptive arbiter 200. In the present invention, requests for access to a PCI bus are received at adaptive arbiter 200 via new request channel 208. Thus, incoming request channel 208 represents the plurality of request lines which are coupled to PCI bus arbiter 200. Each time a request for access to the PCI bus is received at adaptive arbiter 200, the request is recorded as an entry in history buffer 202. In the present embodiment, history buffer 202 is an eight entry first-in-first-out (FIFO) buffer having entries $R_1$ through $R_8$. Therefore, when history buffer 202 is filled with eight entries, a new request causes the oldest entry, $R_8$, to be removed from history buffer 202. Each remaining entry is shifted to the left such that $R_2$ through $R_8$ are occupied and $R_1$ is vacated. The new request then becomes the newest entry, $R_1$, in history buffer 202. Thus, only the eight most recent requests remain in history buffer 202. Although such a buffer is used in the present embodiment, the present invention is also well suited to using various other types and sizes of buffers as history buffer 202.

Referring still to FIG. 2, in the present invention, the identity of the peripheral component making the request is stored in history buffer 202. Hence, in the present embodiment, history buffer 202 provides a log of the eight most recent requests for access to the PCI bus and history buffer 202 indicates which of the peripheral components made the request for access to the PCI bus. In the present embodiment, a three bit identifier is used to identify which peripheral component requested access to the PCI bus. As a result, when full, history buffer 202 contains 8 three bit identifier entries indicating which peripheral components have made the most recent eight requests for access to the PCI bus. Although a three bit identifier is used to identify the peripheral component which makes a request for access to the PCI bus in the present embodiment, the present invention is well suited to storing various other type of identifiers in history buffer 202.

With reference still to FIG. 2, when no peripheral device is requesting access to the PCI bus, it is necessary to "park" the PCI bus on one of the peripheral components. In the present embodiment, when a need to park the PCI bus arises, summation accumulator 204 examines the contents of history buffer 202 to determine which of the plurality of peripheral components requests access to the PCI bus most often. That is, summation accumulator 204 examines each of entries $R_1$ through $R_8$ of history buffer 202. After summation accumulator 204 makes its determination, it instructs priority encoder 206 as to which of the peripheral components requests access to the PCI bus most often. Priority encoder 206 then asserts the grant line of the peripheral component which requests access to the PCI bus most often. As mentioned above, outgoing grant channel 210 represents respective grant lines of peripheral components coupled to adaptive arbiter 200. Thus, adaptive arbiter 200 grants access to the PCI bus to the most frequently requesting peripheral component, when no other peripheral component is requesting access to the PCI bus. In so doing, the present invention always "parks" the PCI bus on the peripheral component which has, in the past, requested access to the PCI bus most often.

Referring yet again to FIG. 2, in one embodiment, priority encoder 206 is adapted to receive additional weighting criteria. In such an embodiment, additional weighting criteria such as, for example, user inputted criteria is used to adjust the determination as to which of the peripheral components will have the PCI bus parked thereon. Such additional weighting criteria include, but are not limited to, the importance of the requesting peripheral component, the length of time the peripheral component requires access to the PCI bus, and the like. As an example, assume that a particular peripheral component, "component X", is known to typically request access to the PCI bus seven consecutive times and then not request access again for an extended period of time. Hence, after all seven consecutive requests have been made by component X, it would not be prudent to park the PCI bus on component X. By importing such additional weighting criteria in priority encoder 206, the PCI bus would not be parked on component X even when seven of the eight entries in history buffer 202 are requests for PCI access by component X. The present invention intelligently determines which peripheral component will have the PCI bus parked thereon.

Thus, unlike the prior art, the present invention does not merely park the PCI bus on the last requesting peripheral component. Instead, the present invention intelligently predicts which of the peripheral components is most likely to next request access to the PCI bus. As a result, the present invention increases the chance that the next requesting peripheral component will be the component on which the PCI bus is parked. In such an instance, the present invention significantly decreases PCI bus latency periods. More specifically, when the PCI bus is parked on a peripheral component which later requests access to the PCI bus, that component's grant line is already asserted. Hence, the present invention eliminates the need for a separate peripheral component to request from access to the PCI, the present invention eliminates the need to deassert a granted line to another peripheral component, and the present invention eliminates the need to assert the grant line to the newly requesting peripheral component. Thus, the present adaptive arbiter 200 improves PCI bus access time by a substantial number of clock cycles. In so doing, the present invention improves overall operation and speed of a computer system.

Figure 3:
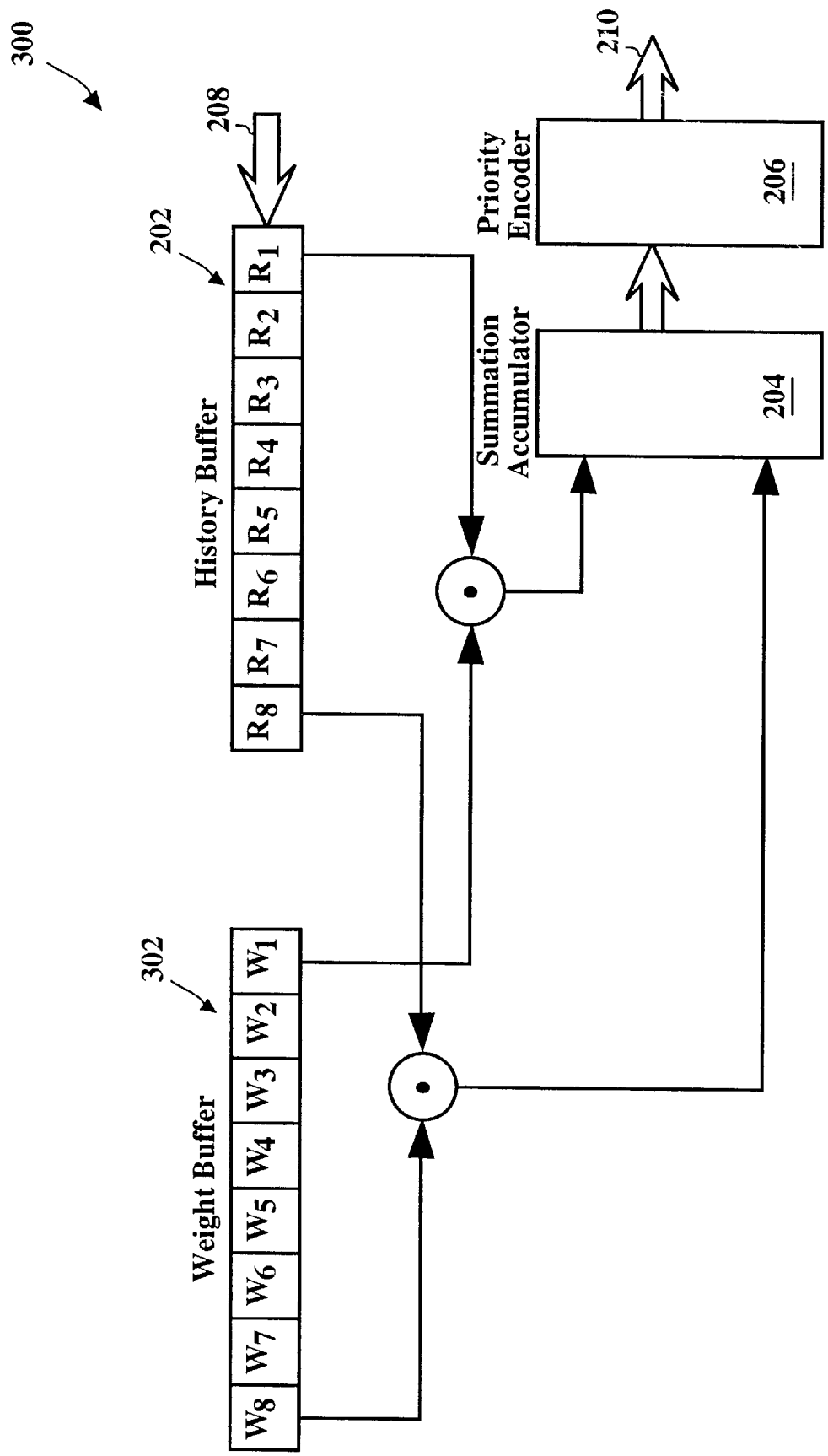
FIG. 3 is a schematic diagram illustrating components of an adaptive arbiter having a weight buffer in accordance with one embodiment of the present claimed invention.

Referring next to FIG. 3, a schematic diagram of the components of another embodiment of an adaptive PCI bus arbiter is shown. As in the previous embodiment, adaptive PCI bus arbiter 300 (hereinafter adaptive arbiter 300) is comprised of a history buffer 202, a summation accumulator 204, a priority encoder 206, incoming request channel 208, and outgoing grant channel 210. In contrast to the embodiment of FIG. 2, the present embodiment also includes a weight buffer 302, and multiplication stages $304_1$ through $304_8$. Although eight multiplication stages are present in the embodiment of FIG. 3, only two of the multiplication stages $304_1$ and $304_8$ are shown for purposes clarity.

In the present invention, requests for access to a PCI bus are received at adaptive arbiter 300 via new request channel 208. Each time a request for access to the PCI bus is received at adaptive arbiter 200, the request is recorded as an entry in history buffer 202. As in embodiment of FIG. 2, history buffer 202 is an eight entry first-in-first-out (FIFO) buffer having entries $R_1$ through $R_8$. Although such a buffer is used in the present embodiment, the present invention is also well suited to using various other types and sizes of buffers as history buffer 202.

Referring still to FIG. 3, in the present invention, the identity of the peripheral component making the request is stored in history buffer 202. In the present embodiment, a three bit identifier is used to identify which peripheral component requested access to the PCI bus. Although a three bit identifier is used to identify the peripheral component which makes a request for access to the PCI bus in the present embodiment, the present invention is well suited to storing various other types of identifiers in history buffer 202.

With reference again to FIG. 3, weight buffer 302 is comprised of an eight entry buffer. In so doing, each of the entries in eight entry FIFO history buffer 202 has a respective entry in weight buffer 302. That is entry $W_1$ of weight buffer 302 corresponds to entry $R_1$ of history buffer 202, entry $W_2$ of weight buffer 302 corresponds to entry $R_2$ of history buffer 202, and so on. In the present embodiment, each of entries $W_1$ through $W_8$ of weight buffer 302 are comprised of order-based multiplication factors. More specifically, entry $W_1$ corresponding to entry $R_1$ of history buffer 202 has a greater value than entry $W_8$ corresponding to entry $R_8$ of history buffer 202. In the present embodiment, $W_1$ has a value of 4, $W_2$ has a value of 4, $W_3$ has a value of 4, $W_4$ has a value of 2, $W_5$ has a value of 2, $W_6$ has a value of 1, $W_7$ has a value of 1, and $W_8$ has a value of 1. Although such order-based multiplication factors are used in the present embodiment, the present invention is also well suited to using various other values ordering schemes.

Referring still to FIG. 3, because of the above described order-based multiplication factor entries of weight buffer 302, $W_1*R_1$ has a greater value than $W_2*R_2$, $W_2*R_2$ has a greater value than $W_3*R_3$, $W_3*R_3$ has a greater value than $W_4*R_4$, and so on. Additionally, the order-based multiplication factors are binary in the present embodiment to simplify the multiplication of each order-based multiplication factor and its corresponding entry in history buffer 202.

With reference still to FIG. 3, when no peripheral device is requesting access to the PCI bus, it is necessary to "park" the PCI bus on one of the peripheral components. In the present embodiment, when a need to park the PCI bus arises, each entry in weight buffer 302 is multiplied by its corresponding entry in history buffer 202. In so doing, a priority value is obtained for each of the peripheral components having its request for access to the PCI bus stored in history buffer 202. For example, if peripheral component A has made the six most recent requests for access to the PCI bus, peripheral component B has made the seventh most request for access to the PCI bus, and peripheral component C made the eighth most recent request for the PCI bus. In such an scenario, the contents of history buffer 202 are as follows: $R_1=A$, $R_2=A$, $R_3=A$, $R_4=A$, $R_5=A$, $R_6=A$, $R_7=B$, and $R_8=C$. Thus, the multiplication stages $304_1$ through $304_8$ will generate the following products: $(W_1*R_1)$, $(W_2*R_2)$, $(W_3*R_3)$, $(W_4*R_4)$, $(W_5*R_5)$, $(W_6*R_6)$, $(W_7*R_7)$, and $(W_8*R_8)$.

Referring still to FIG. 3, after the multiplication stages are completed, summation accumulator 204 determines the priority value for each component. Component A will have a priority value of $(W_1*R_1)+(W_2*R_2)+(W_3*R_3)+(W_4*R_4)+(W_5*R_5)+(W_6*R_6)$. That is, in the present embodiment, the priority value for component A=17. Component B will have a priority value of $(W_7*R_7)$, or B=1. Similarly, component C will have a priority value of $(W_8*R_8)$, or C=1. Hence, summation accumulator 204 determines that component A has the highest priority value. After summation accumulator 204 makes its determination, it instructs priority encoder 206 as to which of the peripheral components has the highest priority value. Priority encoder 206 then asserts the grant line of the peripheral component which has the highest priority value. As mentioned above, outgoing grant channel 210 represents respective grant lines of peripheral components coupled to adaptive arbiter 200. Thus, adaptive arbiter 300 grants access to the PCI bus to the peripheral component having the highest priority value, when no other peripheral component is requesting access to the PCI bus. In so doing, the present invention always "parks" the PCI bus on the peripheral component which, based on the last eight recorded requests, has the highest priority value.

Figure 4:
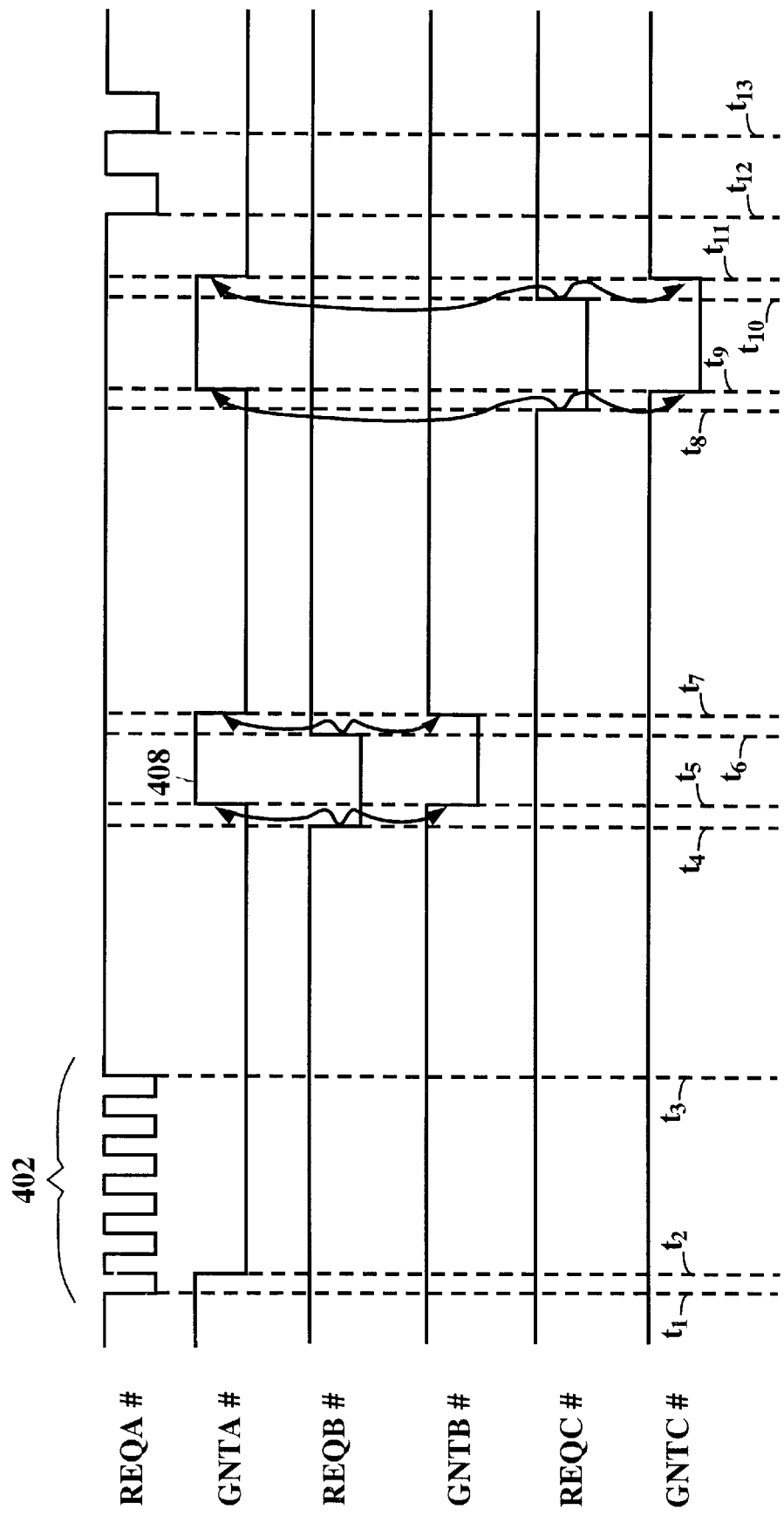
FIG. 4 is a timing diagram illustrating operation of the adaptive arbiter of the embodiment of FIG. 3 in accordance with the present claimed invention.

With reference next to FIG. 4, a timing diagram 400 illustrating operation of the adaptive arbiter 300 of FIG. 3 is shown. FIG. 4 pertains to the above described example in which peripheral component A has made the six most recent requests for access to the PCI bus, peripheral component B has made the seventh most request for access to the PCI bus, and peripheral component C made the eighth most recent request for the PCI bus. Peripheral component A's requests are shown in region 402 as assertions of REQA#. After peripheral component A's first request, at $t_1$, peripheral component A's grant line is asserted as shown by the assertion of GNTA# at $t_2$. Note, even though no component is requesting access to the PCI bus at $t_3$, GNTA# stays asserted in the present invention. At $t_4$ peripheral component B requests access to the PCI bus. Thus, at $t_5$ GNTA# is deasserted and GNTB# is asserted. At $t_6$, no peripheral component requests the PCI bus, however, the present invention at $t_7$ deasserts GNTB# and reasserts GNTA#. Thus, the present invention does not merely park the PCI bus on the last requesting peripheral component.

Referring still to FIG. 4, GNTA# stays asserted until $t_9$, immediately following peripheral component C's request for access to the PCI bus at $t_8$. At $t_9$, GNTA# is deasserted and GNTC# is asserted. At $t_{10}$, no peripheral components requests access to the PCI bus. Because peripheral component A has the highest priority value, as described above in detail, GNTC# is deasserted and GNTA# is asserted at $t_{11}$. Because of the predictive nature the present adaptive arbiter invention, the PCI bus is already parked on peripheral component A when A requests access to the PCI bus at times $t_{12}$ and $_{13}$. As a result, at times $t_{12}$ and $t_{13}$, the present invention eliminates the need to deassert a granted line to peripheral component other than A, and the present invention eliminates the need to assert the grant line to newly requesting peripheral component A. Thus, the present invention improves PCI bus access time by a substantial number of clock cycles.

Referring yet again to FIG. 3, in one embodiment, priority encoder 206 is adapted to receive additional weighting criteria. In such an embodiment, additional weighting criteria such as, for example, user inputted criteria is used to adjust the determination as to which of the peripheral components will have the PCI bus parked thereon. Such additional weighting criteria include, but are not limited to, the importance of the requesting peripheral component, the length of time the peripheral component requires access to the PCI bus, and the like. A detailed description of how such additional weighting criteria is employed can be found above in conjunction with the embodiment of FIG. 2.

Thus, unlike the prior art, the present invention does not merely park the PCI bus on the last requesting peripheral component. Instead, the present invention intelligently determines a priority value for each requesting peripheral component and parks the PCI bus on the peripheral component with the highest priority value. In so doing, the present invention increases the chance that the next requesting peripheral component will be the component on which the PCI bus is parked. As mentioned above, the present invention significantly decreases PCI bus latency periods, and, in turn, improves overall operation and speed of a computer system.

Thus, the present invention provides a system and method for determining the appropriate peripheral component on which to park a PCI bus wherein the system method which does not merely grant access to the PCI bus to the last peripheral component to have accessed the PCI bus. The present invention also provides a system and method which decreases PCI bus access latency periods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An adaptive arbitration method for granting access to a peripheral component interconnect bus comprising the steps of:

a) measuring the frequency with which each of a plurality of peripheral components requests access to a peripheral component interconnect (PCI) bus;

b) recording each of said requests for access to said PCI bus in a history buffer, said recorded requests indicating which of said plurality of peripheral components issued said request and indicating past usage of the PCI bus;

c) weighting each of said recorded requests such that each of said recorded requests has a priority value associated therewith;

d) summing said priority values for each of said recorded requests such that each of said peripheral components has a total priority value associated therewith;

e) comparing said summed priority values to determine which of said peripheral components has the greatest priority value; and f) granting said peripheral component having said greatest priority value access to said PCI bus when no other of said plurality of peripheral components requests access to said PCI bus.

2. The adaptive arbitration method of claim 1 wherein step b) further comprises the step of:

storing said recorded requests in an eight entry first-in-first-out (FIFO) history buffer.

3. The adaptive arbitration method of claim 2 wherein step b) further comprises the step of:

storing a three bit peripheral component identifier in said eight entry FIFO history buffer to indicate which of said plurality of peripheral components issued said request for access to said PCI bus.

4. The adaptive arbitration method of claim 2 wherein step c) further comprises the step of:

multiplying each of said recorded requests in said eight entry FIFO history buffer by a respective multiplication factor stored in a corresponding eight entry weight buffer such that each of said entries in said eight entry FIFO history buffer has a respective multiplication factor associated therewith.

5. The adaptive arbitration method of claim 4 further comprising the step of:

multiplying each of said recorded requests in said eight entry FIFO history buffer by a respective order-based multiplication factor, wherein a respective order-based multiplication factor corresponding to an earlier entered recorded request is less than a respective order-based multiplication factor associated with a later entered recorded request such that said earlier entered recorded request has a priority value which less than a priority value for a later entered request.

6. The adaptive arbitration method of claim 1 wherein step e) further comprises the step of:

applying additional weighting criteria to said summed priority values.

7. An arbitration method for determining which of plurality of peripheral components shall have access to a peripheral component interconnect (PCI) bus when none of the plurality of peripheral components is currently requesting access to the PCI bus comprising the steps of:

a) recording all requests by a plurality of peripheral components for access to a PCI bus, and storing said recorded requests in a first-in-first-out (FIFO) history buffer, said FIFO history buffer records past usage of the PCI bus;

b) determining which of said plurality of peripheral components requests access to said PCI bus most often; and c) granting said peripheral component which requests access to said PCI bus most often access to said PCI bus when no other of said plurality of peripheral components requests access to said PCI bus.

8. The adaptive arbitration method of claim 7 wherein step a) further comprises the step of:

storing said recorded requests in an eight entry first-in-first-out (FIFO) history buffer.

9. The adaptive arbitration method of claim 7 wherein step a) further comprises the step of:

storing a peripheral component identifier in said FIFO history buffer to indicate which of said plurality of peripheral components issued said request for access to said PCI bus.

10. The adaptive arbitration method of claim 9 wherein step a) further comprises the step of:

storing a three bit peripheral component identifier in said FIFO history buffer to indicate which of said plurality of peripheral components issued said request for access to said PCI bus.

11. The adaptive arbitration method of claim 7 further comprising the steps of:

applying additional weighting criteria to said determination of which of said plurality of peripheral components requests access to said PCI bus most often such that said additional weighting criteria affects which of said plurality of peripheral components is granted access to said PCI bus when no other of said plurality of peripheral components requests access to said PCI bus.

12. An system for adaptively arbitrating access to a peripheral component interconnect (PCI) bus comprising:

an adaptive PCI bus arbitrating device configured to arbitrate access for plurality of peripheral components to a PCI bus, said adaptive PCI bus arbitrating device further comprising:

a history buffer, said history buffer adapted to record requests from said plurality of peripheral components for access to said PCI bus; and a summation accumulator coupled to said history buffer for determining which of said plurality of peripheral components has the highest priority value for access to said PCI bus;

a priority encoder coupled to said summation accumulator, said priority encoder granting to said peripheral component which has said highest priority value access to said PCI bus when no other of said plurality of peripheral components requests access to said PCI bus; and a weight buffer coupled to said history buffer and said summation accumulator, said weight buffer for adjusting said priority values of said requests recorded in said history buffer such that said determination by said summation accumulator of which of said plurality of peripheral components has said highest priority value for access to said PCI bus is affected by said weight buffer.

13. The system for adaptively arbitrating access to a PCI bus as recited in claim 12 wherein said priority encoder is further adapted to receive additional weighting criteria such that said determination by said summation accumulator of which of said plurality of peripheral components has said highest priority value for access to said PCI bus is affected by said additional criteria.

14. The system for adaptively arbitrating access to a PCI bus as recited in claim 12 wherein said history buffer is further comprised of a first-in-first-out (FIFO) history buffer.

15. The system for adaptively arbitrating access to a PCI bus as recited in claim 14 wherein said history buffer is further comprised of an eight entry first-in-first-out (FIFO) history buffer.

16. The system for adaptively arbitrating access to a PCI bus as recited in claim 12 wherein said weight buffer is further comprised of a first-in-first-out (FIFO) weight buffer.

17. The system for adaptively arbitrating access to a PCI bus as recited in claim 16 wherein said weight buffer is further comprised of an eight entry first-in-first-out (FIFO) weight buffer.

* * * * *